US006608420B2

(12) United States Patent
Hsieh

(10) Patent No.: US 6,608,420 B2
(45) Date of Patent: Aug. 19, 2003

(54) STATOR OF AN ALTERNATING CURRENT MOTOR

(76) Inventor: Hsin-Mao Hsieh, No. 6, East Section, Chiao Nan Li, Industrial 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 10/034,116

(22) Filed: Jan. 3, 2002

(65) Prior Publication Data

US 2003/0122511 A1 Jul. 3, 2003

(51) Int. Cl.$^7$ .................................................. H02K 1/06
(52) U.S. Cl. .................... 310/217; 310/216; 310/259; 310/254
(58) Field of Search ...................... 310/254, 91, 154.09, 310/154.08, 258, 259, 216, 217; 29/59, 65, 98

(56) References Cited

U.S. PATENT DOCUMENTS

| 2,298,388 | A | * | 10/1942 | Knobel | 310/259 |
| 2,556,013 | A | * | 6/1951 | Thomas | 310/258 |
| 3,122,667 | A | * | 2/1964 | Baciu | 310/45 |
| 4,481,435 | A | * | 11/1984 | Loforese | 310/71 |
| 6,034,461 | A | * | 3/2000 | Sun | 310/218 |

* cited by examiner

Primary Examiner—Karl Tamai
Assistant Examiner—Leda Pham
(74) Attorney, Agent, or Firm—Venable LLC; Fei-Fei Chao

(57) ABSTRACT

A stator includes an integrated yoke with upper and lower insulators provided on upper and lower ends thereof and stator coils directly wound around the insulators and the yoke. Wherein the yoke has an outer annular member and an inner annular member integrally formed therewith. The upper and lower insulators respectively have two outer rings and two inner rings integrally formed therewith corresponding to the outer and inner annular members of the yoke. Whereby the structure of the stator is simple and manufacturing of the stator is efficient.

2 Claims, 5 Drawing Sheets

STATOR OF AN ALTERNATING CURRENT MOTOR

BACKGROUND OF THE INVENTION

1. Field of the Invention

The present invention relates to a stator of an alternating current motor, particularly to the stator having an integrated yoke with stator coils directly wound thereon so as to simplify the structure of the stator.

2. Description of Related Art

Various kinds of alternating current motors are widely used in almost all fields of industry. The speed and torsion of the alternating current motor depends on phases of the stator and the rotor of the motor. A conventional stator of the alternating current motor normally has a complicated structure which results in a complicated production process. For example, as shown in FIGS. 5 and 6, a conventional stator (50) comprises a yoke (51), a winding core (52) fitted in a central cavity of the yoke (51) and symmetrically integrated with two protruded portions (521) at two opposite sides thereof, two insulators (53) respectively provided at opposite ends of the winding core (52), and two stator coils (60) respectively wound around the insulators (53) and the protruded portions (521) of the winding core (52).

The defect of the conventional stator of the alternating current motor is that because the structure of the stator, the stator has at least two components in addition to the insulators (53) and the stator coils (60), thus the production process of the stator must be complicated and the production cost of the stator must be expensive.

Therefore, it is an objective of the invention to provide an improved stator of alternating current motor to mitigate and/or obviate the aforementioned problems.

SUMMARY OF THE INVENTION

The main object of the present invention is to provide a stator having a simplified structure, wherein the stator has an integrated yoke with the stator coils directly wound thereon so as to simplify the structure of the stator.

Other objects, advantages and novel features of the invention will become more apparent from the following detailed description when taken in conjunction with the accompanying drawings.

DETAILED DESCRIPTION OF THE PREFERRED EMBODIMENT

Figure 1:
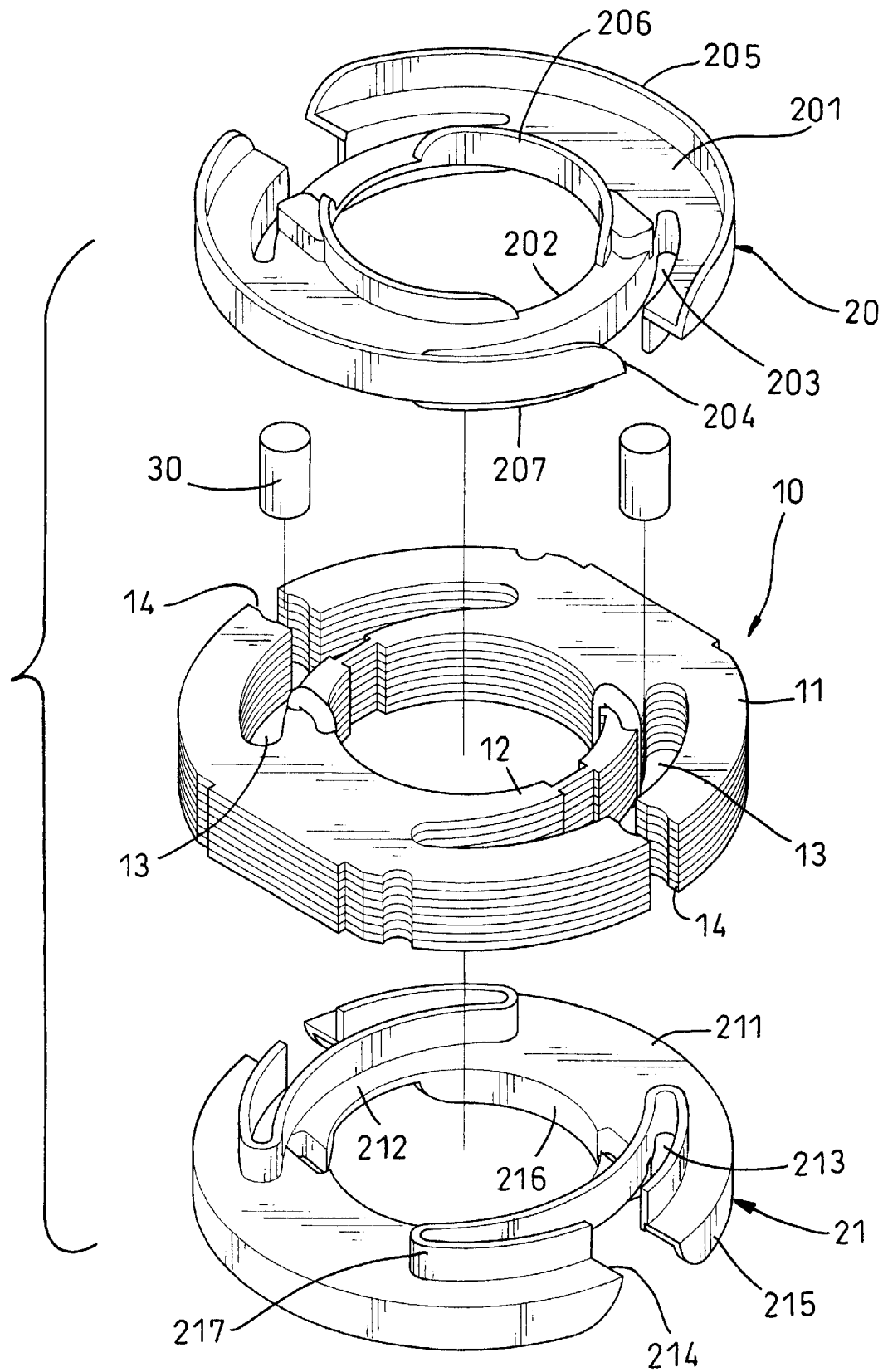
FIG. 1 is an exploded perspective view of a stator of an AC motor in accordance with the invention.
Figure 2:
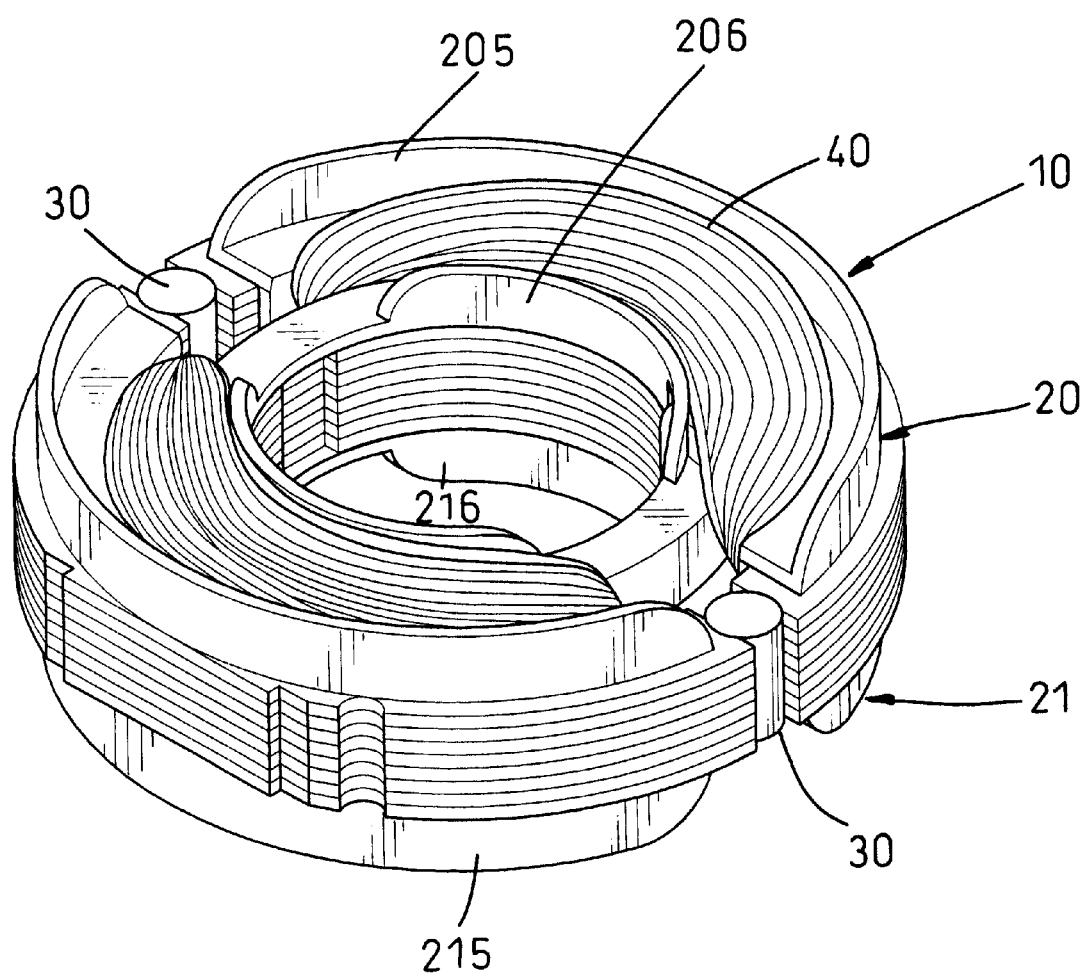
FIG. 2 is a perspective view of the stator of the AC motor in accordance with the invention.

As shown in FIGS. 1 and 2, a stator comprises an integrated yoke (10), upper and lower insulators (20, 21) respectively provided at upper and lower ends of the yoke (10), and two joint keys (30) provided at two opposite sides of the yoke (10).

The yoke (10) is integrally formed with an outer annular member (11) and an inner annular member (12), and symmetrically defined with two winding slots (13) disposed between the outer and inner annular members (11, 12) at two opposite lateral sides thereof. Two cut-outs (14) are symmetrically defined at two opposite sides of the outer annular member (11) and respectively communicated with middle positions of the winding slots (13).

The upper and lower insulators (20, 21) are formed in an identical shape substantially corresponding to the shape of the yoke (10) and symmetrically assembled on the upper and lower ends of the yoke (10). The upper and lower insulators (20, 21) respectively have two outer rings (201, 211) and two inner rings (202, 212) integrally formed therewith, two pairs of slots (203, 213) defined at opposite sides thereof corresponding to the winding slots (13) of the yoke (10), and two pairs of openings (204, 214) defined at opposite outer sides thereof corresponding to the cut-outs (14) of the yoke (10).

Peripheries of upper ends of the outer rings (201) and peripheries of lower ends of the outer rings (211) are respectively formed with outer edges (205, and 215) therearound. Peripheries of upper ends of the inner rings (202) and peripheries of lower ends of the inner rings (212) are respectively formed with inner edges (206, and 216) therearound. Peripheries of lower ends of the slots (203) and peripheries of upper ends of the slots (213) are respectively formed with joint edges (207, 217) therearound.

Figure 3:
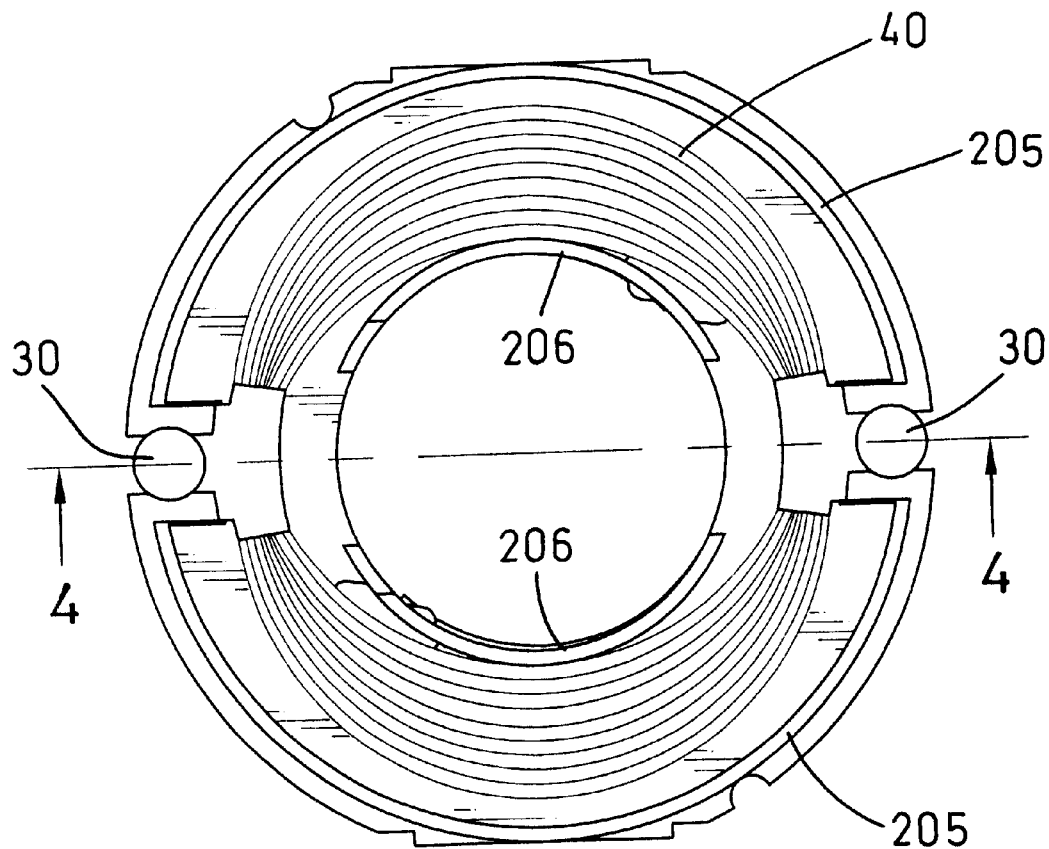
FIG. 3 is a plan view of the stator of the AC motor in accordance with the invention.
Figure 4:
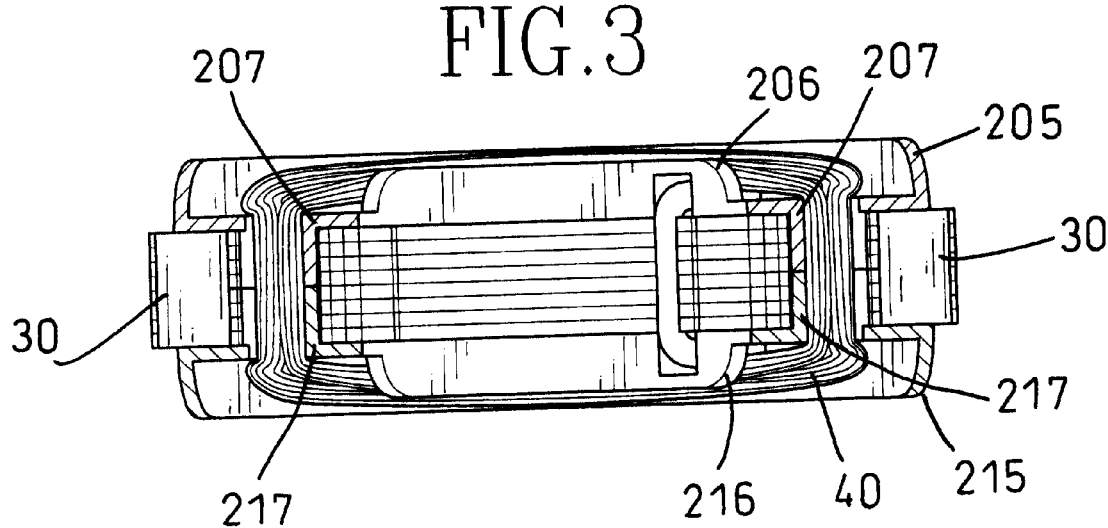
FIG. 4 is a cross sectional view along line 4—4 in FIG. 3 of the stator of the AC motor in accordance with the invention.
Figure 5:
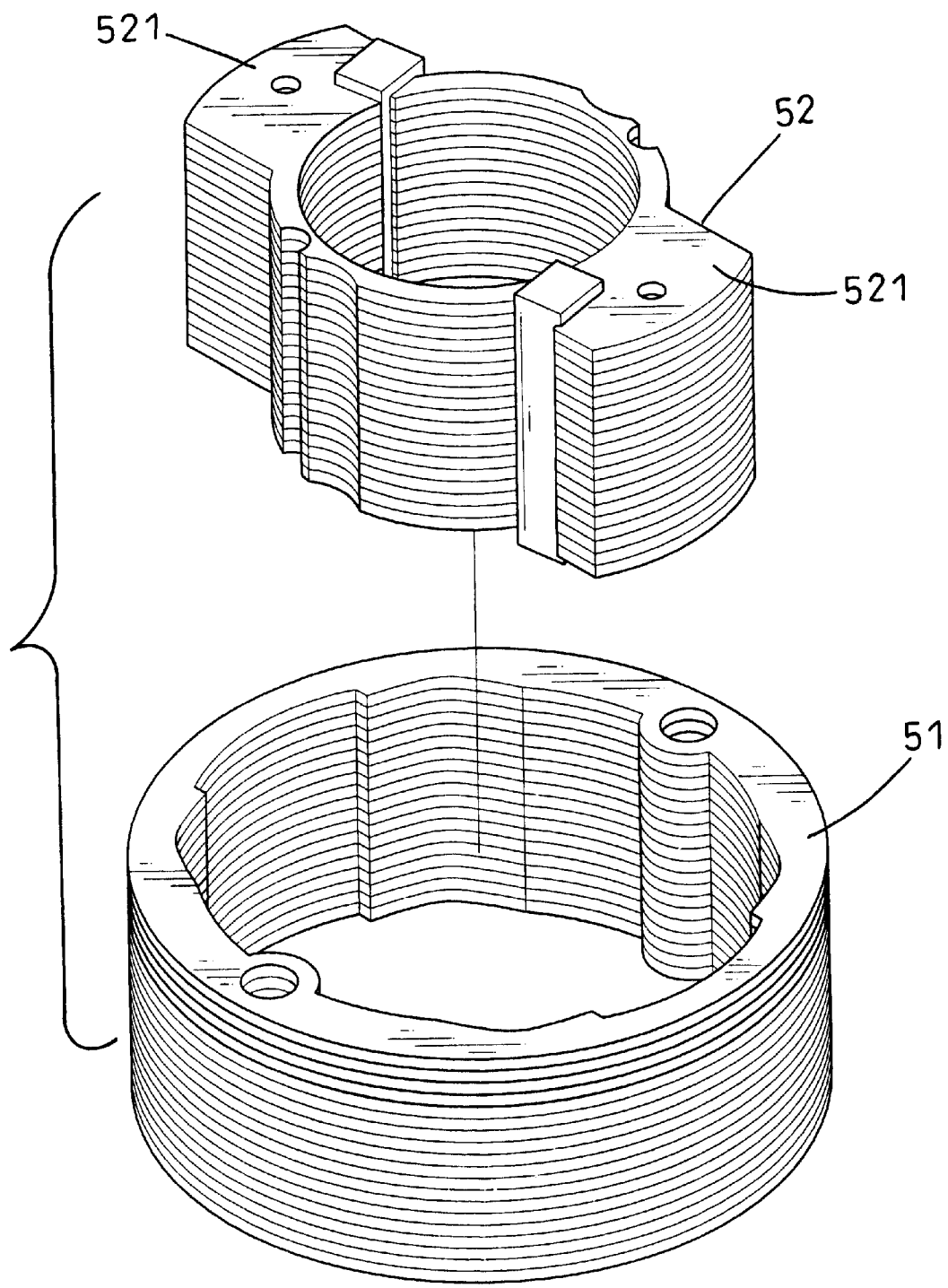
FIG. 5 is an exploded perspective view of a conventional stator of an AC motor.
Figure 6:
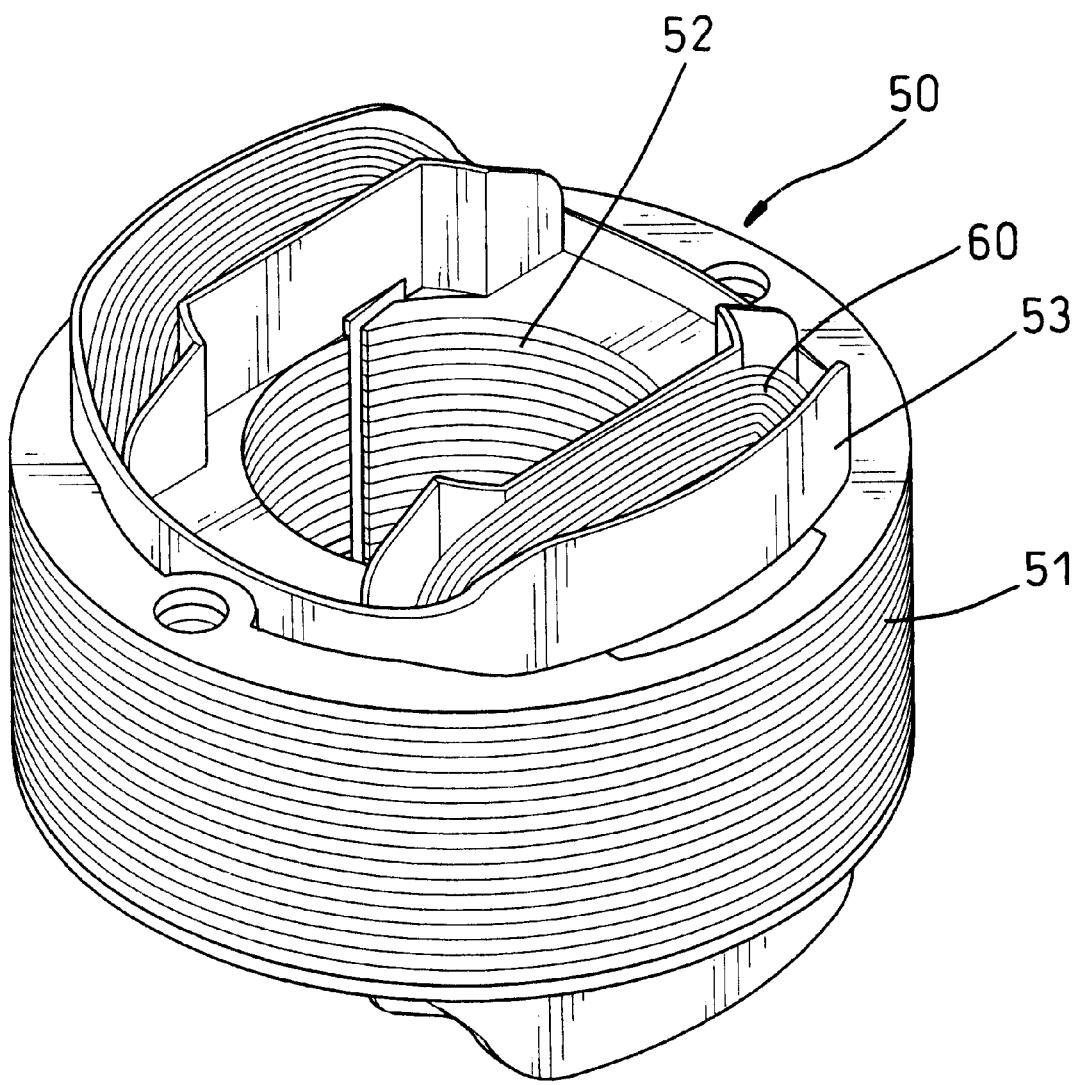
FIG. 6 is a perspective view of the conventional stator of the motor.

Whereby the upper and lower insulators (20, 21) are respectively assembled on upper and lower ends of the yoke (10) by means of the joint edges (207, 217) respectively inserted into the corresponding winding slots (13). As illustrated in detail in FIGS. 3 and 4, the joint edges (207, 217) are combined together in the winding slot (13) to form a passage for receiving of wires of stator coils (40). The wires of the stator coils (40) are respectively extended through the openings (204, 214) and cut-outs (14) into passages combined by the joint edges (207, 217) and would around the upper and lower insulators (20, 21) to bind the upper and lower insulators (20, 21) together with the yoke (10). After the stator coils (40) are wound, the joint keys (30) are respectively fixed into the cut-outs (13) of the yoke (10), such that a stator is easily produced.

The advantage of the invention is that because the yoke (10) of the stator is formed in an integrated member, the stator coils (40) are directly wound around the yoke (10), and the stator (10) fewer components than those of the conventional stator, so that the production cost of the stator (10) of the invention is no more than that of the conventional stator, yet the cost is low due to the smaller number of components in the present invention.

Another advantage of the invention is that the upper and lower insulators (20, 21) are easily assembled on the yoke (10) by simply inserting the joint edges (207, 217) into the winding slots (13), and the stator coils (40) are able to be directly wound around the upper and lower insulators (20, 21) and bound together with the yoke (10), whereby the assembly of the stator is simplified, so that the production efficiency of the stator (10) is increased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stator of an alternating current motor, the stator comprising:

a yoke (10) having an outer annular member (11) and an inner annular member (12) integrally formed therewith, two winding slots (13) symmetrically defined at two opposite lateral sides between the outer and inner annular members (11, 12), and two cut-outs (14) symmetrically defined at two opposite sides of the outer annular member (11) and respectively communicating with middle positions of the winding slots (13); wherein said yoke is a single-body;

upper insulator and lower insulator (20, 21) respectively assembled on upper and lower ends of the yoke (10), and respectively having two outer rings (201, 211) and two inner rings (202, 212) integrated therewith corresponding to the outer and inner annular members (11, 12), two pairs of slots (203, 213) respectively defined at opposite sides thereof corresponding to the winding slot (13) of the yoke (10), and two pairs of openings (204, 214) respectively defined at opposite sides of the outer rings (201, 211) corresponding to the cut-outs (14); wherein each of said upper insulator and said lower insulator is a single-body;

wherein first bulged outer edges (205) are formed around outer sides of upper ends of the outer rings (201) of the upper insulator (20), and first bulged inner edges (206) are formed around inner sides of upper ends of inner rings (202) of the upper insulator (20);

wherein second bulged outer edges (215) are formed around outer sides of lower ends of the outer rings (211) of the lower insulator (21), second bulged inner edges (216) are formed around inner sides of lower ends of inner rings (212) of the lower insulator (20), and the lower ends of the slots (203) and upper ends of the slots (213) are respectively formed with bulged joint edges (207, 217) around, whereby the upper and lower insulators (20, 21) are respectively assembled on the yoke (10) by means of the joint edges (207, 217) respectively inserted into the corresponding winding slot (13) of the yoke (10);

whereby after the upper and lower insulators (20, 21) are respectively assembled on upper and lower ends of the yoke (10), wires of stator coils are respectively wound around the upper and lower insulators (20, 21) and bind the upper and lower insulators (20, 21) together with the yoke (10).

2. The stator as claimed in claim 1, wherein two joint keys (30) are respectively fixed into the two cut-outs (14) of the yoke (10).

* * * * *